(12) United States Patent
Chavignier et al.

(10) Patent No.: US 9,809,301 B2
(45) Date of Patent: Nov. 7, 2017

(54) ACTUATOR FOR CONTROLLING A FLIGHT CONTROL SURFACE

(71) Applicant: Safran Electronics & Defense, Boulogne-Billancourt (FR)

(72) Inventors: Louis Chavignier, Boulogne-Billancourt (FR); Marc Lebrun, Boulogne-Billancourt (FR); Severin Viennot, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 15/312,118

(22) PCT Filed: May 21, 2015

(86) PCT No.: PCT/EP2015/061314
§ 371 (c)(1),
(2) Date: Nov. 17, 2016

(87) PCT Pub. No.: WO2015/177301
PCT Pub. Date: Nov. 26, 2015

(65) Prior Publication Data
US 2017/0088252 A1   Mar. 30, 2017

(30) Foreign Application Priority Data
May 21, 2014 (FR) .................................. 14 54581

(51) Int. Cl.
*B64C 13/28* (2006.01)
*F16H 25/20* (2006.01)
*F16H 25/24* (2006.01)

(52) U.S. Cl.
CPC ........... *B64C 13/28* (2013.01); *F16H 25/205* (2013.01); *F16H 25/2015* (2013.01); *F16H 25/2454* (2013.01)

(58) Field of Classification Search
CPC ....... B64C 13/50; B64C 13/503; B64C 13/38; F16H 25/2015; F16H 25/2454; F16H 25/205
See application file for complete search history.

(56) References Cited

U.S. PATENT DOCUMENTS 4,637,272 A * 1/1987 Teske ...................... B64C 13/42
                                                                192/48.9
2015/0276029 A1* 10/2015 Marvin ................. F16H 25/205
                                                                  74/89.29

FOREIGN PATENT DOCUMENTS

DE      102011018446 A1    10/2012
DE      102012000987 A1     7/2013
(Continued)

OTHER PUBLICATIONS

French Search Report with English Language Translation Cover Sheet, dated Jan. 28, 2015, French Application No. 1454581.
(Continued)

*Primary Examiner* — Brian M O'Hara
(74) *Attorney, Agent, or Firm* — Blakely Sokoloff Taylor & Zafman LLP

(57) ABSTRACT

The invention relates to an actuator (4) for controlling a flight control surface (3) of an aircraft, comprising:—a primary route (5) comprising a first member (8) for generating a first torque, and a first drive shaft (10) having an end (18) able to be connected to the first member (8) and an end (19) able to be connected to the control surface (3),—a secondary route (6) comprising a second member (24) for generating a second torque and a second drive shaft (26) having an end (45) able to be connected to the second
(Continued)

member (24) and an end (46) able to be connected to the control surface (3), in which actuator the second drive shaft (10) is hollow and extends around the first drive shaft (26).

14 Claims, 5 Drawing Sheets

(56) References Cited

FOREIGN PATENT DOCUMENTS

| EP | 1731421 A1 | 12/2006 |
|----|------------|---------|
| WO | WO-0171217 A1 | 9/2001 |
| WO | WO-2008023198 A1 | 2/2008 |

OTHER PUBLICATIONS

International Search Report with English Language Translation, dated Aug. 4, 2015, PCT Application No. PCT/EP2015/061314.

\* cited by examiner

ACTUATOR FOR CONTROLLING A FLIGHT CONTROL SURFACE

FIELD OF THE INVENTION

The invention relates to an actuator for controlling an aircraft flight control surface.

PRIOR ART

In airplanes, the control surfaces (movable flaps or ailerons) make it possible to modify the flow of the surrounding air on the surface of the airplane, so as to control the position of the airplane in space.

The control surfaces comprise for example the primary flight control surfaces which are actuated during flight phases, and the secondary flight control surfaces (leading edge slats, lift flaps) which are actuated only during certain lowspeed phases, particularly during the phases of takeoff and landing.

Among the primary flight control surfaces, the ailerons located at the ends of the wing of the airplane make it possible to control the roll attitude of the airplane.

These flight control surfaces are mounted pivotally with respect to the fuselage of the airplane and each control surface is actuated mechanically by a control actuator accommodated in the wing of the airplane.

It would be practicable to use electromechanical control actuators to operate these control surfaces.

However, in the event of failure of such an actuator, there exists a risk that the control surface is found to be "floating." This type of failure would cause a loss of control of the airplane and would consequently constitute a catastrophic event.

Moreover, airplane constructors have a tendency to design airplanes having thinner and thinner wings. It is therefore necessary to design actuators which have a reduced use of space, so as to be able to accommodate them in the wing of an airplane.

SUMMARY OF THE INVENTION

One aim of the invention is to propose a control actuator for an aircraft control surface which has a small use of space so as to be accommodated inside a wing, while having good reliability.

This aim is achieved within the scope of the present invention thanks to an actuator for controlling a flight control surface of an aircraft, comprising:
  a primary path comprising a first member for generating a first torque, and a first drive shaft having an end capable of being connected to the first member and an end capable of being connected to the control surface,
  a secondary path comprising a second member for generating a second torque and a second drive shaft having an end capable of being connected to the second member and an end capable of being connected to the control surface,
  wherein the second drive shaft is hollow and extends around the first drive shaft.

The primary path and the secondary path make it possible to control the control surface independently. Thus, in the event of a failure in one of the paths, the other path can control the position of the control surface by avoiding having it left floating. The safe behavior of the actuator is thus ensured by control of the position of the control surface.

Moreover, because the first drive shaft is nested within the second drive shaft, it is possible to design a compact actuator (having a small diameter), capable of being accommodated in a thin aircraft wing such as those currently developed by aviation manufacturers.

The actuator can also have the following characteristics:
  the actuator comprises a casing, and the first member or the second member is an electric motor capable of driving in rotation the first drive shaft with respect to the casing to displace the control surface,
  the actuator comprises a casing, and the first member or the second member is a brake capable of blocking rotation of the first drive shaft or of the second drive shaft with respect to the casing to prevent displacement of the control surface,
  the brake is capable of allowing rotation of the first drive shaft or of the second drive shaft when the brake is supplied with electrical power and of blocking the rotation of the first drive shaft or of the second drive shaft when the brake is not supplied with electrical power,
  the brake comprises a first brake disk fixedly mounted in rotation with the casing and a second brake disk fixedly mounted in rotation with the second drive shaft, the first brake disk and the second brake disk being capable of being displaced with respect to one another between an engaged position in which the disks are in contact with one another for blocking the second drive shaft in rotation and a disengaged position in which the brake disks are spaced from one another to allow rotation of the second drive shaft,
  the brake further comprises an elastic return member capable of biasing the brake disks toward the engaged position,
  the brake further comprises an electromagnet which, when it is activated, is capable of biasing the brake disks toward the disengaged position,
  the second member surrounds the first drive shaft,
  the primary path comprises a first mechanical reduction assembly, and the first member is connected to the first drive shaft through the first mechanical reduction assembly,
  the secondary path comprises a second mechanical reduction assembly, and the second member is connected to the second drive shaft through the second mechanical reduction assembly,
  the second mechanical reduction assembly surrounds the first drive shaft,
  the end of the first drive shaft capable of being connected to the control surface has first reliefs capable of cooperating with reliefs of the control surface to connect in rotation the first drive shaft and the control surface,
  the end of the second drive shaft capable of being connected to the control surface has second reliefs capable of cooperating with reliefs of the control surface to connect in rotation the second drive shaft and the control surface,
  the second reliefs extend in the continuation of the first reliefs, so that the first reliefs and the second reliefs cooperate with the same reliefs of the control surface,
  the first drive shaft is movable along a first axis of rotation and the second drive shaft is movable along a second axis of rotation, the second axis of rotation being coincident with the first axis of rotation,
  the first member comprises a stator and a rotor rotatably mounted with respect to the stator, the rotor being connected to the first drive shaft to drive the first drive shaft in rotation, and the primary path comprises a first position sensor capable of measuring an angular position of the rotor with respect to the stator, the secondary path comprises a second position sensor capable of measuring an angular position of the second drive shaft.

PRESENTATION OF THE DRAWINGS

Other features and advantages will also be revealed by the description that follows, which is purely illustrative and not limiting and must be read with reference to the appended drawings, among which:

DETAILED DESCRIPTION OF ONE EMBODIMENT

Figure 1:
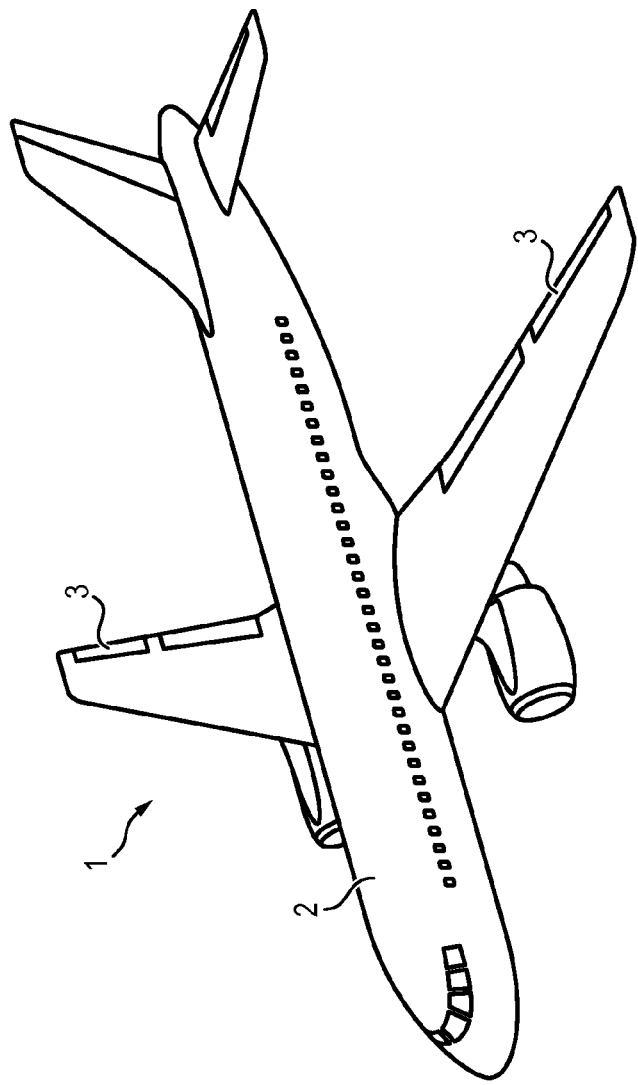
FIG. 1 shows an aircraft schematically.

In FIG. 1, the aircraft 1 shown is an airplane comprising a fuselage 2 and control surfaces 3 movably mounted with respect to the fuselage 2. The control surfaces 3 are ailerons located at the ends of the wings of the airplane. These ailerons 3 make it possible to control the roll attitude of the airplane, i.e. the rotational movement of the airplane around the longitudinal axis of the airplane. Each aileron 3 is mounted movable in rotation with respect to the fuselage 2, around an axis of rotation extending substantially parallel to a trailing edge of the wing. The adjustment of the position of each aileron 3 is ensured by a control actuator associated with the aileron 3.

Figure 2:
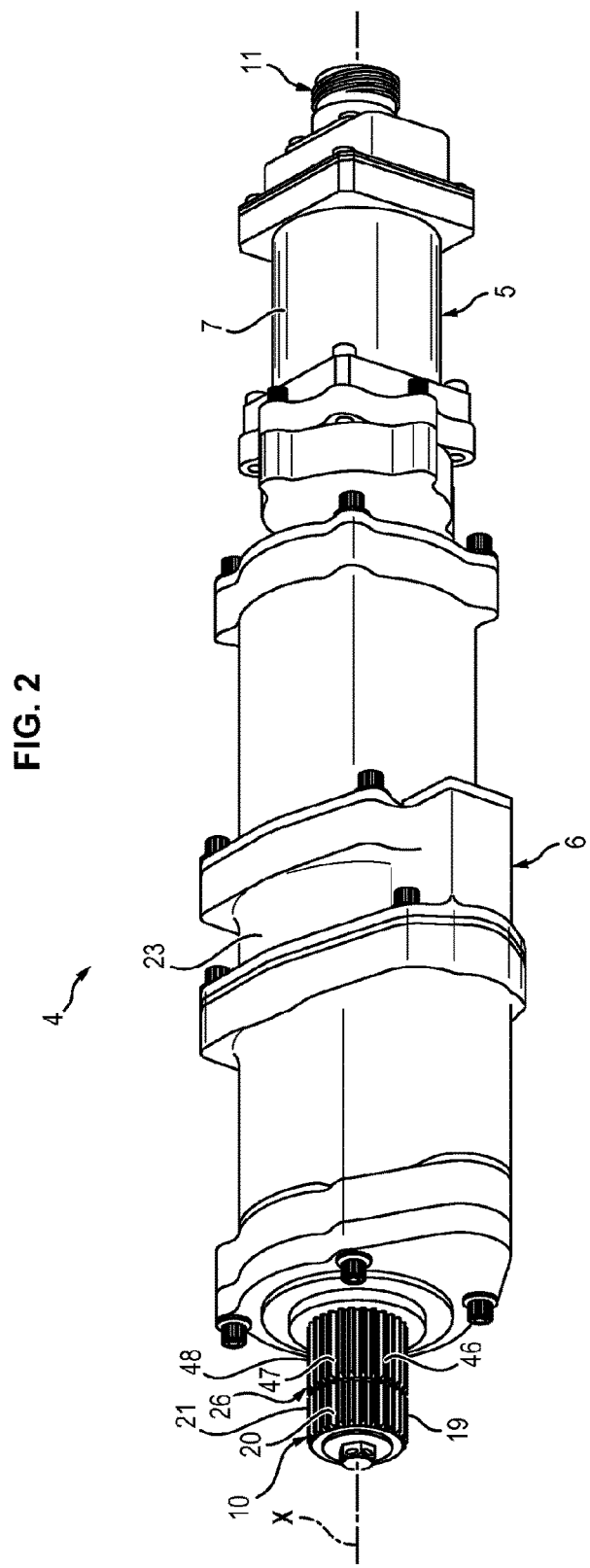
FIGS. 2 and 3 show schematically in perspective an actuator conforming to an embodiment of the invention.
Figure 3:
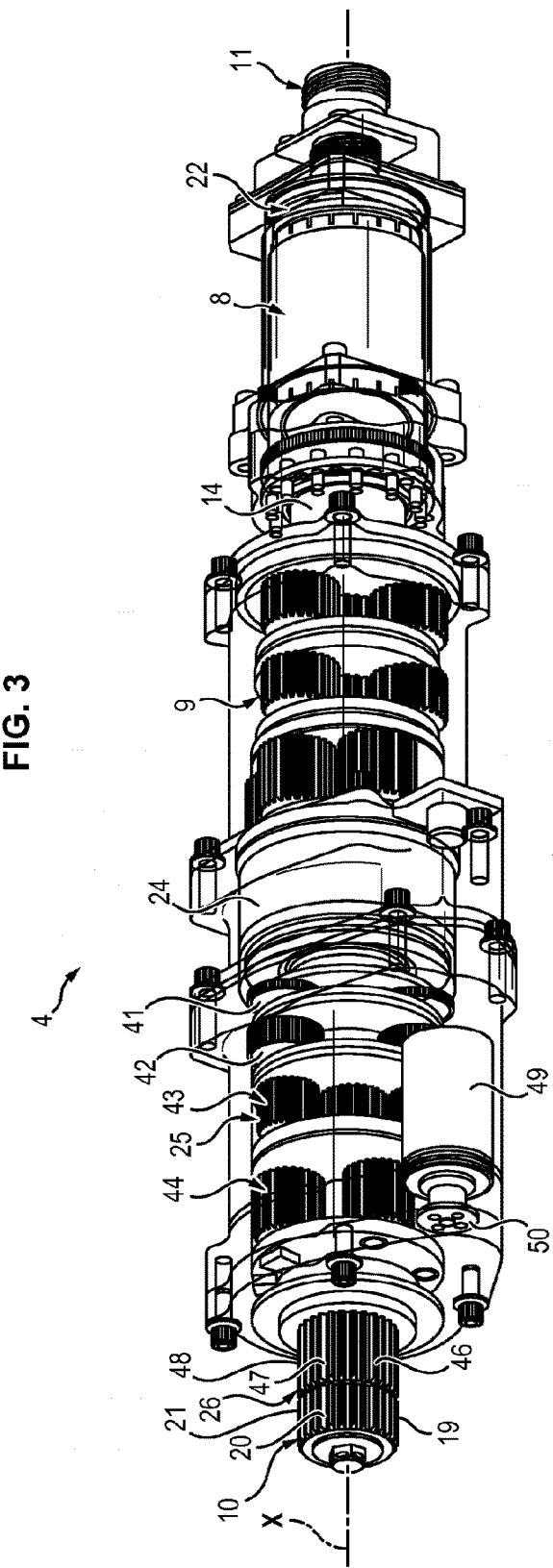
Figure 4:
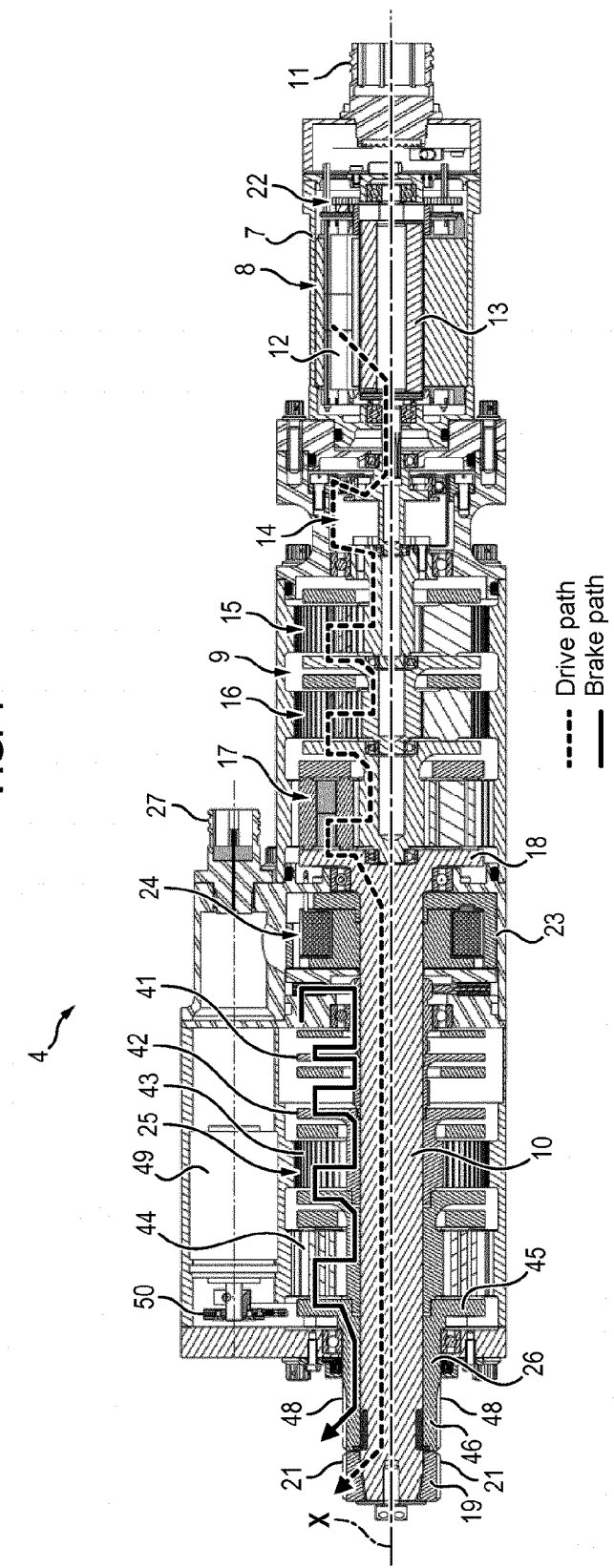
FIG. 4 shows schematically the actuator of FIGS. 2 and 3, in longitudinal section.

In FIGS. 2 to 4, the control actuator 4 shown comprises a primary path 5 and an independent secondary path 6. In the embodiment illustrated in these figures, the primary path 5 is a drive path, capable of generating a drive torque to drive in rotation the flight control surface 3, and the secondary path 6 is a braking path, capable of generating a braking torque which opposes rotation of the flight control surface 3.

The primary path 5 comprises a first casing 7, an electric motor 8, a first mechanical reduction assembly 9 and a first drive shaft 10.

The first casing 7 is attached to the fuselage 2 of the airplane.

The primary path 5 also comprises a first connector 11 attached to the first casing 7, the first connector 11 making it possible to connect the primary path 5 to the flight control computer to control the primary path.

The electric motor 8 is a permanent magnet synchronous motor. The electric motor 8 comprises a stator 12 fixedly mounted on the first casing 7 and a rotor 13 mounted movable in rotation with respect to the stator 12. The rotor 13 is mounted movable in rotation with respect to the stator 12 around an axis of rotation X, which is also the axis of rotation of the flight control surface 3. Moreover, the axis X is also the longitudinal axis of the actuator 4.

The first mechanical reduction assembly 9 comprises several reduction gears mounted in series. In other words, the output of one reduction gear is connected to the input of the following reduction gear.

In the embodiment shown in FIGS. 2 to 4, the first mechanical reduction assembly 9 comprises for example four reduction gears 14 to 17. The four reduction gears include one reduction gear with a high reduction ratio 14 mounted at the output of the electric motor 8, and three epicyclic gear trains 15 to 17.

The reduction gear with a high reduction ratio 14 is for example a harmonic reduction gear. In known fashion, the harmonic reduction gear 14 comprises an elliptic hub mounted integral in rotation with the rotor of the electric motor, a ball bearing crimped to the elliptic hub, a cup with external teeth made of a flexible material extending around the ball bearing, and a rigid ring with internal teeth rotatably mounted with respect to the casing. The cup made of flexible material is deformed by the elliptic hub, which causes partial engagement of the cup with the rigid ring. The rigid ring comprises a greater number of teeth than the number of teeth of the cup. During operation, a rotation of the elliptic hub (which constitutes the input element of the reduction gear) drives a propagation of the deformation of the cup around the axis of rotation of the hub, and consequently a displacement of the engagement zone between the cup and the rigid ring. In this manner, the rigid ring (which constitutes the output element of the reduction gear) is driven in rotation at a rotation speed less than the rotation speed of the elliptic hub.

The elliptic hub (which constitutes the input element of the reduction gear) of the reduction gear with a high reduction ratio is fixedly mounted in rotation with the rotor 13 of the electric motor 8.

In a known manner, each epicyclic gear train 15 to 17 comprises an inner planetary gear (which constitutes the input element of the epicyclic gear train), a ring gear (fixed to the first casing 7), a planet gear carrier (which constitutes the output element of the epicyclic gear train) and planet gears. The inner planetary gear, the ring gear and the planet gear carrier are mounted movable in rotation with respect to one another around a common axis of rotation, which is also the axis X. Each planet is rotatably mounted on the planet gear carrier and meshes with the planetary gear and the ring gear, so that a rotation of the inner planetary gear drives rotation of the planet gear carrier through the planet gears, the speed of rotation of the planet gear carrier being less than the rotation speed of the inner planetary gear.

The inner planetary gear of the first epicyclic gear train 15 is mounted integral in rotation with the output element of the reduction gear 14. The inner planetary gear of the second epicyclic gear train 16 is mounted integral in rotation with the planet gear carrier of the first epicyclic gear train 15. Likewise, the inner planetary gear of the third epicyclic gear train 17 is mounted integral in rotation with the planet gear carrier of the second epicyclic gear train 16. Finally, the planet gear carrier of the third epicyclic gear train 17 is mounted integral in rotation with the first drive shaft 10.

The first drive shaft 10 is mounted movable in rotation with respect to the first casing 7 around the axis X. The first drive shaft 10 comprises two opposite ends: a first end 18 connected to the planet gear carrier of the third epicyclic gear train 17 and a second end 19 capable of being connected to the flight control surface 3.

To this end, the second end 19 has an external surface 20 having first splines 21. The first splines 21 extend in a longitudinal direction of the first drive shaft 10, parallel to the axis X. The first splines 21 are capable of cooperating with splines of the flight control surface 3, so that the flight control surface 3 is fixed in rotation with the first drive shaft 10.

When the electric motor 8 is supplied with electrical power, the first drive shaft 10 is driven in rotation by the electric motor 8 through the first mechanical reduction assembly 9. The first drive shaft 10 is thus driven at a smaller rotation speed than the rotation speed of the rotor 13 of the electric motor 8.

The primary path 5 also comprises a first position sensor 22 capable of measuring an angular position of the rotor 13 with respect to the stator 14.

The first position sensor 22 is for example an incremental coder comprising a rotary disk fixedly mounted in rotation with the rotor 13 of the electric motor 8. The first position sensor 22 is capable of generating a first position signal representing the angular position of the rotor 13 with respect to the stator 12. This first signal is transmitted to the flight control computer (FCC) through the first connector 11.

The secondary path 6 comprises a second casing 23, a brake 24, a second mechanical reduction assembly 25 and a second drive shaft 26.

The second casing 23 is attached to the fuselage 2 of the airplane.

The secondary path 6 also comprises a second connector 27 attached to the second casing 23. The second connector 27 makes it possible to connect the secondary path 6 to the flight control computer to control the secondary path.

The brake 24 extends around the first drive shaft 10.

Figure 5:
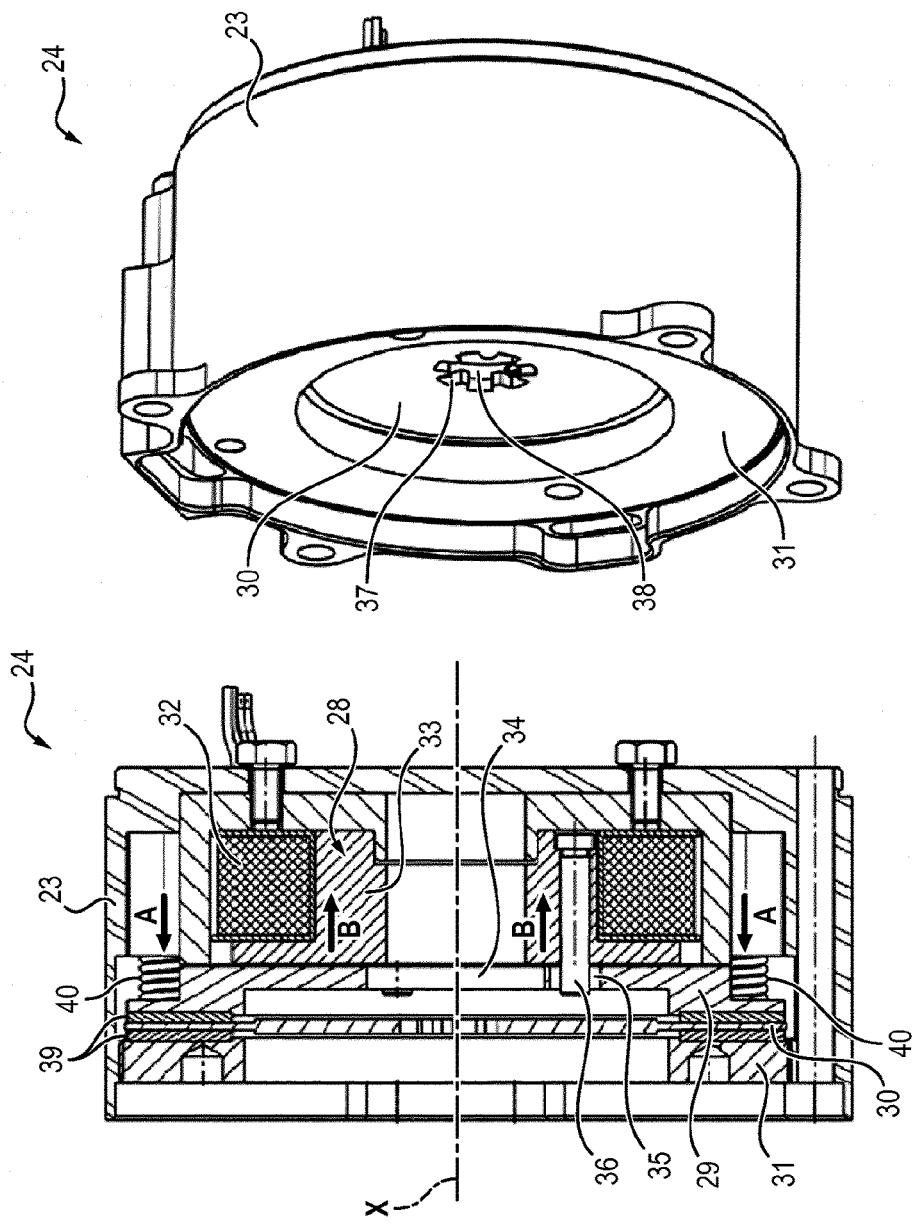
FIG. 5 shows schematically the brake of the actuator.

As illustrated in more detail in FIG. 5, the brake 24 comprises an electromagnet 28 and three brake disks. The three brake disks include a first brake disk 29, a second brake disk 30 and a third brake disk 31.

The electromagnet 28 has a generally annular shape and extends around the first drive shaft 10. The electromagnet 28 comprises an annular winding 32 and a solenoid plunger 33 mounted movable in translation with respect to the winding, along an axis of displacement parallel to the axis X. The winding 32 is fixedly mounted on the second casing 23. When it is supplied with electrical power, the winding 32 generates a magnetic field which causes a displacement in translation of the solenoid plunger 33 with respect to the winding 32.

The first brake disk 29 also has a generally annular shape. The first brake disk 29 has a central opening 34 through which extends the first drive shaft 10.

The first brake disk 29 (or brake plate) is mounted movable in translation with respect to the second casing 23 parallel to the axis X, while still being fixed in rotation with the second casing 23. To this end, the first brake disk 29 has an antirotation opening 35 and the brake 24 comprises an antirotation pin 36 attached to the second casing 23. The antirotation pin 36 extends through the antirotation opening 35 of the first brake disk 29 so as to prevent rotation of the first brake disk 29 with respect to the second casing 23 around the axis X. The first brake disk 29 is fixed to the solenoid plunger 33 of the electromagnet 28, so that a displacement in translation of the solenoid plunger 33 with respect to the winding 32 causes a concomitant identical translation of the first brake disk 29 parallel to the axis X.

The second brake disk 30 (or rotating disk) is rotatably mounted with respect to the second casing 23 around the axis X. Moreover, the second brake disk 30 is fixedly integral in rotation with the second drive shaft 26, while still being movable in translation with respect to the second drive shaft 26 parallel to the axis X.

To this end, the second brake disk 30 comprises splines 37 capable of cooperating with complementary splines of the second drive shaft 26. More precisely, the second brake disk 30 comprises a central opening 38 through which extends the second drive shaft 26, the central opening 38 having splines capable of engaging in the complementary splines of the second drive shaft 26.

The brake 24 also comprises a brake lining 39 attached to the second brake disk 30, on the periphery of the second brake disk 30 and on each face thereof. The brake lining 39 is formed from a friction material.

The third brake disk 31 (or fixed disk) is fixedly mounted on the second casing 23.

The first brake disk 29 and the third brake disk 31 are positioned on either side of the second brake disk 30.

Finally, the brake 24 comprises one or more elastic return member(s) 40. In the embodiment illustrated in FIG. 5, the elastic return members 40 are compression springs interposed between the first brake disk 29 and the second casing 23.

The first brake disk 29 is movable in translation with respect to the second casing 23 between an engaged position in which the first brake disk 29 presses upon the second brake disk 30 between the first brake disk 29 and the third brake disk 31, and a disengaged position in which the brake disks 29 to 31 are free with respect to one another.

The elastic return members 40 are arranged to bias the first brake disk 29 toward the engaged position, in a first direction (arrow A).

The electromagnet 28 is arranged so that when it is supplied with electrical power, the electromagnet 28 biases the first brake disk 29 toward the disengaged position, in a second direction (arrow B) opposite to the first direction, against the elastic return members 40.

Moreover, as illustrated in FIGS. 2 to 4, the second mechanical reduction assembly 25 comprises several reduction gears mounted in series. In other words, the output of one reduction gear is connected to the input of the following reduction gear.

In the embodiment shown in FIGS. 2 to 4, the second mechanical reduction assembly 25 comprises for example four reduction gears. The four reduction gears include four epicyclic gear trains 41 to 44.

In known fashion, each epicyclic gear train 41 to 44 comprises an inner planetary gear (which constitutes the input element of the epicyclic gear train), a ring gear (attached to the second casing 23), a planet gear carrier (which constitutes the output element of the epicyclic gear) and planet gears. The inner planetary gear, the ring gear and the planet gear carrier are mounted movable in rotation with respect to one another around a common axis of rotation, which is also the axis X. Each planet gear is rotatably mounted on the planet gear carrier and meshes with the planetary gear and the ring gear, so that rotation of the inner planetary gear drives rotation of the planet gear carrier through the planet gears, the speed of rotation of the planet gear carrier being less than the rotation speed of the inner planetary gear.

The inner planetary gear of the first epicyclic gear train 41 is fixedly mounted in rotation with the second brake disk 30 (or rotating disk). The inner planetary gear of the second epicyclic gear train 42 is fixedly mounted in rotation with the planet gear carrier of the first epicyclic gear train 41. Likewise, the inner planetary gear of the third epicyclic gear train 43 is fixedly mounted in rotation with the planet gear carrier of the second epicyclic gear train 42. The inner planetary gear of the fourth epicyclic gear train 44 is fixedly mounted in rotation with the planet gear carrier of the third epicyclic gear train 43. Finally, the planet gear carrier of the fourth epicyclic gear train 44 is fixedly mounted in rotation with the second drive shaft 26.

The second drive shaft 26 is mounted movable in rotation with respect to the second casing 23 around the axis X. The second drive shaft 26 is hollow and surrounds the first drive shaft 10.

Moreover, the second drive shaft 26 comprises two opposite ends: a first end 45 connected to the planet gear carrier of the fourth epicyclic gear train 44 and a second end 46 capable of being connected to the flight control surface 3.

To this end, the second end 46 has an external surface 47 having second splines 48. The second splines 48 extend in a longitudinal direction of the second drive shaft 26, parallel to the axis X. The second splines 48 are capable of cooperating with the splines of the flight control surface 3, so that the flight control surface 3 is fixed in rotation with the second drive shaft 26.

The second splines 48 extend in the continuation of the first splines 21, so that the first splines 21 and the second splines 48 cooperate with the same splines of the control surface 3.

Finally, the secondary path 6 comprises a second position sensor 49 capable of measuring an angular position of the second drive shaft 26. The second sensor 49 is mounted on the second casing 23. The second sensor 49 is for example an incremental coder comprising a rotating disk. The second sensor 49 also comprises a toothed gear 50 fixedly mounted in rotation with the rotary disk, the toothed gear 50 being capable of meshing with the second drive shaft 26. In this manner, rotation of the second drive shaft 26 brings about proportional rotation of the rotary disk of the incremental coder.

The second position sensor 49 is capable of generating a second position signal representing the angular position of the second drive shaft 26 with respect to the second casing 23. This second signal can be transmitted to the flight control computer (FCC) through the second connector 27.

In normal operation, the brake 24 is initially in the engaged position. Indeed, the electromagnet 28 is not supplied with electrical power. The elastic return members 40 bias the brake disks 29 to 31 toward the engaged position (arrow A). As a result, the flight control surface 3 is blocked in a fixed position with respect to the fuselage 2 of the airplane, the brake 24 preventing rotation of the flight control surface 3.

In this manner, the flight control surface 3 is held in a fixed position, without it being necessary to supply the brake 24 with electrical power. This makes it possible to limit the electrical power consumption of the control actuator 4. This also makes it possible to maintain the control surface in a fixed position in the event of a power interruption.

To modify the position of the flight control surface 3, the flight control computer controls simultaneously the supply of electrical power to the electric motor 8 and to the brake 24.

The electric motor 8 being supplied with electrical power, the rotor 13 of the electric motor 8 is driven in rotation with respect to the stator 12. As a result, the rotor 13 of the electric motor drives in rotation the first drive shaft 10 with respect to the first casing 7 through the first mechanical reduction assembly 9.

Moreover, the brake 24 also being supplied with electrical power, the solenoid plunger 33 of the electromagnet 28 is driven in translation with respect to the winding 32, which has the effect of biasing the brake disks 29 to 31 toward the disengaged position (arrow B), against the elastic return members 40.

Under the action of the electromagnet 28, the brake disks 29 to 31 move from the engaged position to the disengaged position.

Once the brake disks 29 to 31 are in the disengaged position, the second drive shaft 26 is free to rotate with respect to the second casing 23.

The flight control surface 3 is driven in rotation around the axis X under the influence of the first drive shaft 10.

Simultaneously, the second drive shaft 26 being fixed in rotation with the flight control surface 3, the second drive shaft 26 is driven in rotation with respect to the second casing 23 by the flight control surface.

Thus, the first drive shaft 10 and the second drive shaft 26 are driven simultaneously in rotation around the axis X. Moreover, the two drive shafts 10 and 26 are driven in rotation at the same speed.

The flight control computer receives the first measurement signal generated by the first position sensor 22 and the second measurement signal generated by the second position sensor 49. The flight control computer (FCC) compares the second signal with the first signal and determines from it whether the actuator is operating normally. As long as the difference between the signals is zero, the computer deduces that the actuator is operating normally.

When the flight control computer has reached the commanded position, the flight control computer orders a stop to the supply of electrical power to the electric motor 8 and the brake 24. The electromagnet 28 then stops biasing the brake disks 29 to 31 toward the disengaged position. The elastic return members 40 bias the brake disks 29 to 31 toward the engaged position (arrow B).

The brake disks 29 to 31 are moved from the disengaged position to the engaged position under the action of the elastic return members 40.

Once the brake disks 29 to 31 are in the engaged position, the brake 24 prevents any rotation of the second drive shaft 26, and the flight control system 3 is again locked into position.

In the event of damage to the primary path 5, due for example to breakage of one of the mechanical parts of the primary path 5, the first drive shaft 10 and the second drive shaft 26 are no longer driven in rotation at the same speed. The flight control computer detects a difference in speed by comparing the second signal with the first signal.

In this case, the flight control computer cuts electrical power supply to the electric motor 8 and the brake 24. The brake 24 is thus held in the engaged position due to the elastic return members 40. In this manner, the flight control surface 3 is held locked in position with respect to the fuselage of the airplane. This avoids having the flight control surface 3 floating.

In case of damage to the secondary path 6, due for example to breakage of one of the mechanical parts of the secondary path 6, the flight control computer detects a difference in speed by comparing the second signal with the first signal.

In this case, the flight control computer can control the electric motor 8 so that the electric motor 8 acts as a brake on the flight control surface 3. In this manner, the flight control surface is held in position with respect to the fuselage 2 of the airplane under the action of the electric motor 8. This also avoids having the flight control surface 3 floating.

Generally, in the event of a failure in one of the paths, the other path makes it possible to control the position of the flight control surface 3 by avoiding leaving it floating.

The proposed actuator 4 thus avoids a loss of control of the airplane which would constitute a catastrophic event.

Moreover, as the two paths 5 and 6 are independent, the flight control computer can detect a failure by comparing the position signals coming from both paths. Once the failure is detected, the computer can notify the failure to the pilot. The actuator 4 can then be sent to maintenance for repair.

The invention claimed is:

1. An actuator for controlling a flight control surface of an aircraft, comprising:
   a primary path comprising
   a first member for generating a first torque, and
   a first drive shaft having a first end for connecting to the first member and a second end for connecting to the control surface, the second end of the first drive shaft having first splines cooperating with splines of the control surface to connect in rotation the first drive shaft and the control surface,
   a secondary path comprising
   a second member for generating a second torque and
   a second drive shaft having a first end for connecting to the second member and a second end for connecting to the control surface, the second end of the second drive shaft, having second splines cooperating with the splines of the control surface to connect in rotation the second drive shaft and the control surface,
   wherein the second drive shaft is hollow and extends concentrically around the first drive shaft, and
   the second splines extend in a continuation of the first splines so that the first splines and the second splines cooperate with the corresponding splines of the control surface.

2. The actuator according to claim 1, comprising a casing and wherein the first member is an electric motor or driving in rotation the first drive shaft with respect to the casing to move the control surface.

3. The actuator according to claim 1, comprising a casing and wherein the second member is a brake or blocking rotation of the second drive shaft with respect to the casing to prevent displacement of the control surface.

4. The actuator according to claim 3, wherein the brake is for allowing rotation of the second drive shaft when the brake is supplied with electrical power and blocking rotation of the second drive shaft when the brake is not supplied with electrical power.

5. The actuator according to claim 3, wherein the brake comprises a first brake disk fixedly mounted in rotation with the casing and a second brake disk fixedly mounted in rotation with the second drive shaft, the first brake disk and the second brake disk being capable of being displaced with respect to one another between an engaged position in which the disks are in contact with one another for blocking the second drive shaft in rotation and a disengaged position in which the brake disks are spaced from one another to allow rotation of the second drive shaft.

6. The actuator according to claim 5, wherein the brake further comprises an elastic return member for biasing the brake disks toward the engaged position.

7. The actuator according to claim 5, wherein the brake further comprises an electromagnet which, when it is activated, is capable of biasing the brake disks toward the disengaged position.

8. The actuator according to claim 1, wherein the second member surrounds the first drive shaft.

9. The actuator according to claim 1, wherein the primary path comprises a first mechanical reduction assembly, and wherein the first member is connected to the first drive shaft through the first mechanical reduction assembly.

10. The actuator according to claim 1, wherein the secondary path comprises a second mechanical reduction assembly and wherein the second member is connected to the second drive shaft through the second mechanical reduction assembly.

11. The actuator according to claim 10, wherein the second mechanical reduction assembly surrounds the first drive shaft.

12. The actuator according to claim 1, wherein the first drive shaft is movable along a first axis of rotation and the second drive shaft is movable along a second axis of rotation, the second axis of rotation being coincident with the first axis of rotation.

13. The actuator according to claim 1, wherein the first member comprises a stator and a rotor rotatably mounted with respect to the stator, the rotor being connected to the first drive shaft to drive the first drive shaft in rotation, and the primary path comprises a first position sensor for measuring an angular position of the rotor with respect to the stator.

14. The actuator according to claim 1, wherein the secondary path comprises a second position sensor for measuring an angular position of the second drive shaft.

\* \* \* \* \*